United States Patent
Patten

(10) Patent No.: US 7,021,344 B2
(45) Date of Patent: Apr. 4, 2006

(54) REMOVABLE FUEL TANK FOR DIESEL ENGINES

(75) Inventor: John P. Patten, Orlando, FL (US)

(73) Assignee: Hugr Systems, Inc., Apopka, FL (US)

( * ) Notice: Subject to any disclaimer, the term of this patent is extended or adjusted under 35 U.S.C. 154(b) by 0 days.

(21) Appl. No.: 10/966,043

(22) Filed: Oct. 14, 2004

(65) Prior Publication Data

US 2005/0109420 A1 May 26, 2005

Related U.S. Application Data

(60) Provisional application No. 60/510,859, filed on Oct. 14, 2003.

(51) Int. Cl.
B65B 1/04 (2006.01)

(52) U.S. Cl. .................... 141/367; 141/329; 141/2; 220/86.2

(58) Field of Classification Search .............. 141/2, 141/18, 19, 329, 330, 367, 94; 220/86.2, 220/253; 215/26, 203, 230, 309
See application file for complete search history.

(56) References Cited

U.S. PATENT DOCUMENTS 5,375,635 A * 12/1994 Tice .............................. 141/94

* cited by examiner

*Primary Examiner*—Steven O. Douglas
(74) *Attorney, Agent, or Firm*—James H. Beusse; Beusse Brownlee Wolter Mora & Maire, P.A.

(57) ABSTRACT

A method for preventing use of an unapproved fuel in a diesel engine uses a fuel tank that does not have a conventional fueling opening and has a puncturable fitting for connection to fuel lines of the engine. The engine fuel lines terminate in a mount that has fangs adapted for puncturing the fuel tank fitting. The tank is against the mount so that the fangs puncture the fitting to allow fuel to flow from the tank to the fuel line. Since the tank does not have a fuel filling opening, it cannot be refilled without special equipment and must be removed from the engine for refilling.

3 Claims, 5 Drawing Sheets

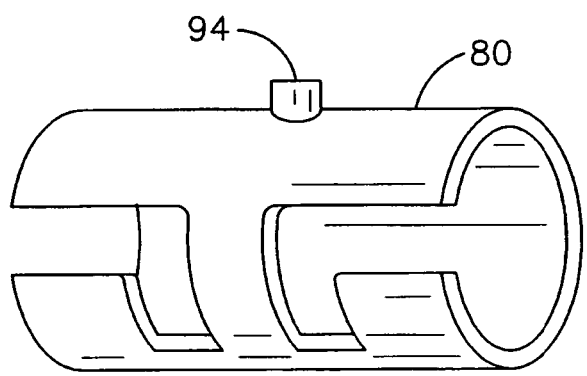
FIG. 13
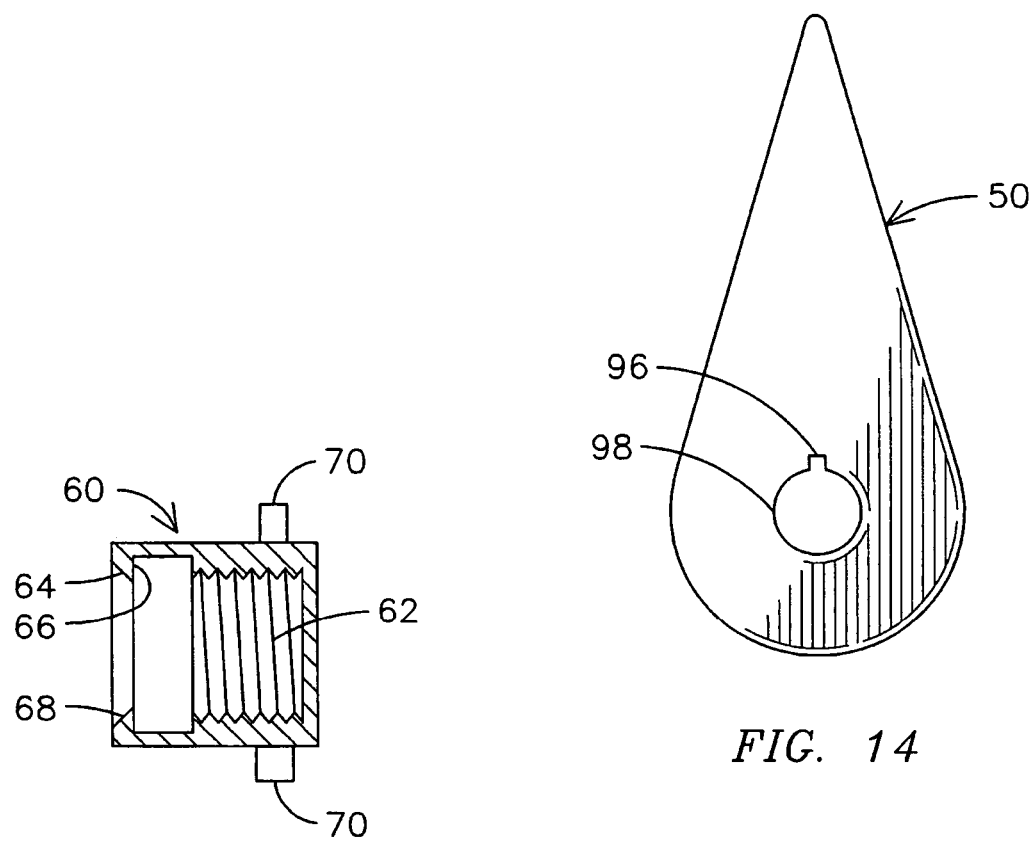
FIG. 14
FIG. 15
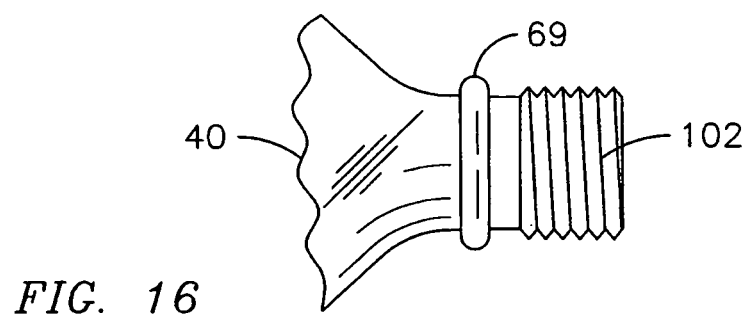
FIG. 16

REMOVABLE FUEL TANK FOR DIESEL ENGINES

SPECIFIC DATA RELATED TO THE INVENTION

This application claims the benefit of U.S. Provisional application No. 60/510,859 filed Oct. 14, 2003.

BACKGROUND OF THE INVENTION

The present invention relates to diesel engines, and, more particularly, to a method and apparatus for assuring that a diesel engine is used only with a fuel designed specifically for operation in the engine. Diesel engines are well known in the art and multi-cylinder diesel engines have long been used in powering large machinery such as locomotives and over-the-road trucks. Smaller multi-cylinder diesel engines have also been adapted for use in certain automobiles. Currently, even smaller single cylinder diesel engines have been developed for use in relatively low power applications. All of these diesel engines routinely produce high levels of hydrocarbon emissions and are therefore not particularly environmentally friendly. Applicant has found that the hydrocarbon and other emissions from such diesel engines can be significantly reduced by utilization of a bio-diesel fuel in the engines. In particular, applicant has found that the use of a fuel manufactured from used vegetable oil can be used in these engines and will cause the engines to fall well within the emissions guideline of the United States Environmental Protection Agency. The problem that the EPA has with such engines is that the fuel source must be controlled in such a manner as to prevent conventional hydrocarbon-base diesel fuel from being used in such engine. If a user of such engine substitutes ordinary hydrocarbon-base diesel fuel into the engines, the emissions from the engine will likely exceed the EPA requirements and thus result in an engine which produces environmentally harmful pollutants.

An example of a single cylinder diesel engine is a Model 186F available from ETQ Power Products of Baldwin Park, Calif. The Model 186F diesel engine is rated at 10 horsepower but has been known to produce significant hydrocarbon emissions when operating on conventional hydrocarbon-base diesel fuel. This same engine has been tested with bio-diesel fuel manufactured from used vegetable oil and found to produce emissions that are well below conventional EPA guidelines when using this alternative fuel. Accordingly, EPA may approve use of this engine in the U.S. if the engine can be limited to operation on bio-diesel fuel.

Applicant has found that one method of preventing substitution of hydrocarbon based diesel fuel into a diesel engine is to provide a fuel tank for use on such engines that is not refillable by the user of the engine. For example, the fuel tank is not provided with a refill cap of the conventional type. In applicant's invention, the fuel tank is removable from the engine and must be returned to a dealer in such fuel tanks for replacement. Only the dealer has the equipment necessary to refill the tank and to restore it to its normal operating condition. For this purpose, the fuel tank must be readily removable from the diesel engine and easily attachable to the engine in order to allow the consumer to replace the tank as necessary. Further, the attachments to the engine should be designed in such a manner that they cannot be bypassed so as to allow a user to connect a different type of tank to the engine.

BRIEF DESCRIPTION OF THE DRAWINGS

FIG. 13 shows the connecting sleeve of FIG. 10;

FIG. 14 is a side view of the lever of FIG. 6;

FIG. 15 is a cross-sectional view of the fuel tank cap; and

FIG. 16 is a view of the connecting end of the fuel tank.

DETAILED DESCRIPTION OF THE INVENTION

Figure 1:
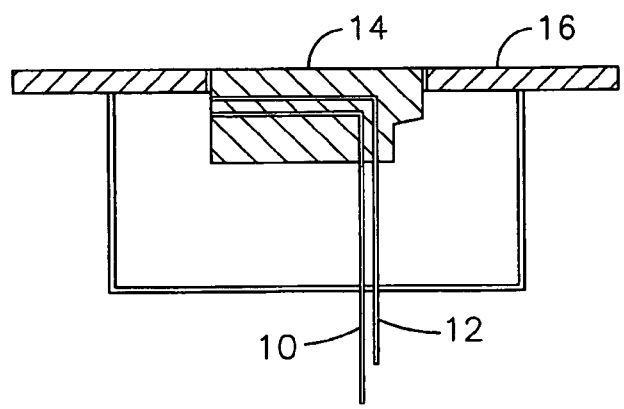
FIG. 1 is a simplified schematic representation of a fuel tower used in one embodiment of the present invention.
Figure 2:
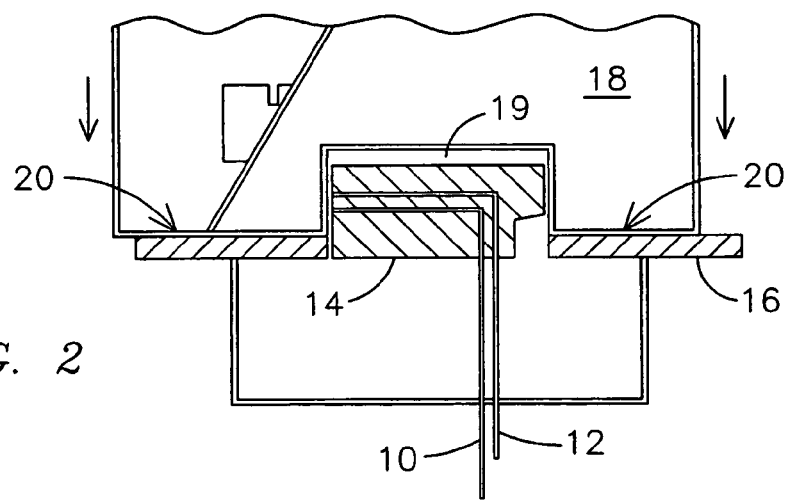
FIG. 2 illustrates the fuel tower of FIG. 2 with a fuel tank positioned for coupling to the tower.

FIGS. 1–5 illustrate one embodiment of a removable fuel tank which minimizes the opportunity for a user of a diesel engine to connect the fuel lines to the diesel engine for receiving fuel from a source other than the designed fuel tank. As shown in FIG. 1, a diesel engine typically has a pair of fuel lines, 10 and 12, with the line 10 representing the fuel feed line from a fuel tank to the engine while line 12 represents a fuel return line from the engine to the fuel tank. Both the fuel return line and the fuel feed line are mounted within a support block 14. The support block 14 rests within a recess in a fuel tank support 16 that is adjacent the diesel engine (not shown). The tank support 16 is spring mounted in the vertical direction in FIG. 1. The support 16 can be pressed downward to expose the support block 14. As shown in FIG. 2, the fuel tank 18 has a lower recess 19 that fits over the support block 14 while the other lower edges 20 of the tank press downward on the support 16. For purposes of description, it may be noted that the block 14 is also referred to as the fuel tower.

Figure 3:
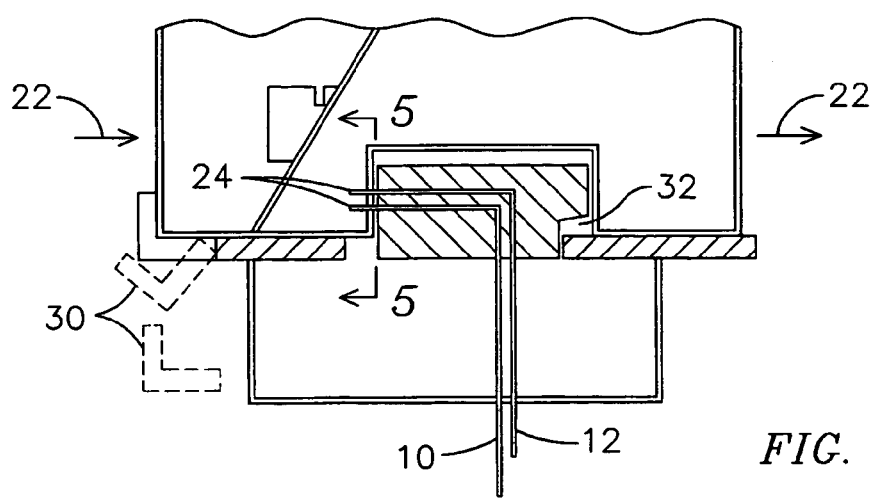
FIG. 3 illustrates the fuel tower of FIG. 1 with fuel lines coupled to the fuel tank of FIG. 2.
Figure 4:
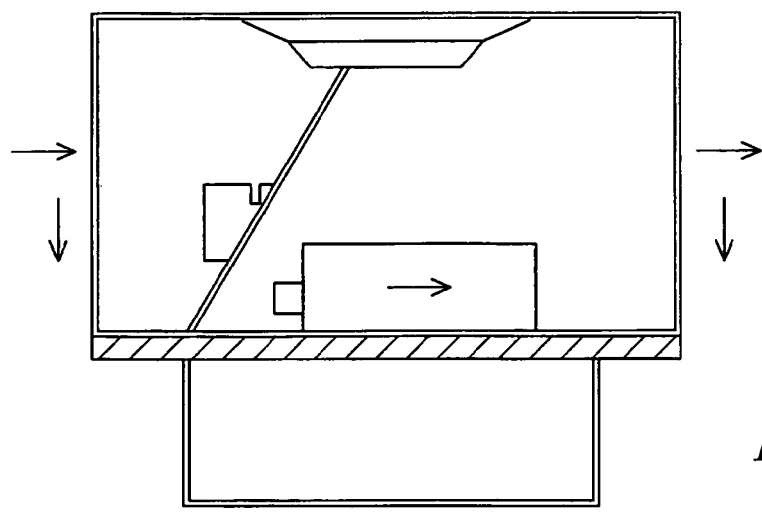
FIG. 4 illustrates coupling of the fuel lines to the fuel tank.
Figure 5:
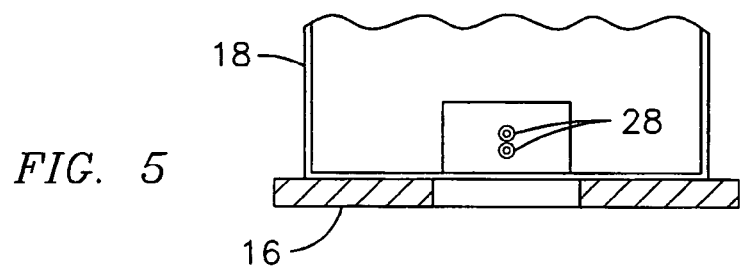
FIG. 5 illustrates the fuel line receptacles of the fuel tank.

Once the tank 18 has been placed on the platform or support 16 and pressed downward exposing the fuel tower or block 14, the tank is then slid in the direction of the arrow 22 as shown in FIG. 3. This lateral movement causes the block 14 to move and exposes a pair of fuel fittings 24 on the end of the fuel feed line 10 and fuel return line 12. The fittings 24 are positioned to fit into a pair of mating receptacles in the fuel tank 26 so that the final assembly appears as shown in FIG. 4.

A cross-sectional view taken along the lines 6—6 of FIG. 3 shows the mating receptacles 28 adapted for receiving the fuel fittings 24. In a preferred form, the mating receptacles 28 are conventional elastomeric diaphragms that are punctured by the fuel fitting 24 and seal around the fittings when they enter the fuel tank 18. Since these receptacles 28 are punctured by the fittings 24, the tank will leak if fuel is placed in the tank after puncturing of the fittings thus deterring re-use of the tank.

As shown in FIG. 3, the fuel tank 18 may be latched in place by a pivoting latch member 30 at one edge of the support 16. The tank 18 is urged against the latch 30 by spring action from the block 14. The spring function for block 14 is not shown but its implementation will be apparent to persons skilled in the art just as the spring action for support 16 will be apparent. The block 14 has a cutaway portion at 32 which allows it to move laterally over top edge 34 of support 16. When the tank 18 is to be removed, the latch 30 is released and allows the tank to be slid toward the latch so that the fittings 24 disconnect and the tank lifted from support 16. If needed, a latch or other clamp mechanism may be used to hold the side of the tank opposite latch 30 to the support 16. The tank 18 can be refilled by removing the receptacles 28, filling the tank with fuel and then installing new, unpunctured receptacles 28.

Figure 6:
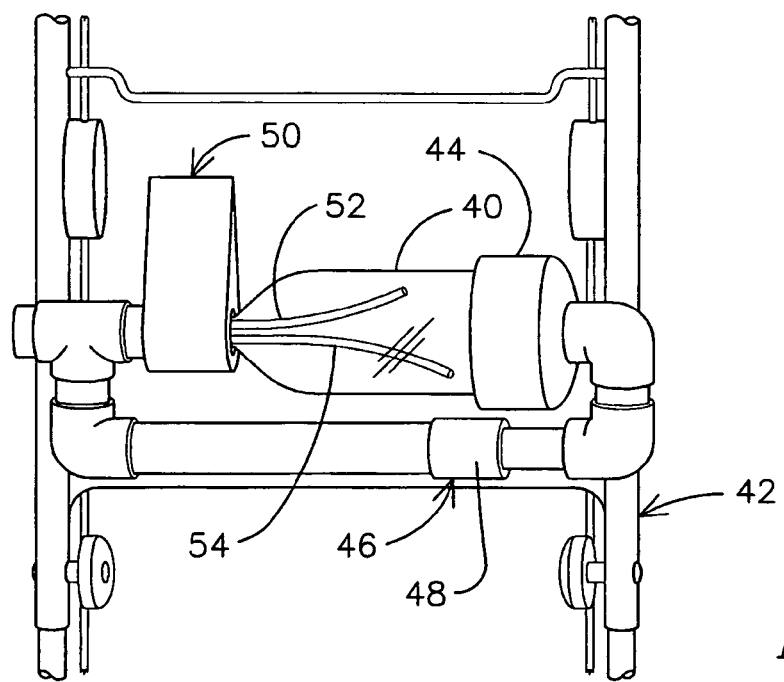
FIG. 6 illustrates another embodiment of the invention using a fuel tank formed from a cola container.

An alternate embodiment of the inventive removable fuel tank is shown in FIG. 6. In this figure, the tank utilizes a conventional two or three liter bottle of the type typically used for containing soft drinks, since such bottles are inexpensive, plentiful and can be discarded after a single use. In FIG. 6, an implementation using such a disposable bottle 40 is shown coupled to a set of handles 42 on a typical lawn mower incorporating a small diesel engine (not shown). The fuel containing tank or bottle 40 is supported in a horizontal position but it will be recognized that other positions could be utilized and may, in fact, be preferred as will be described later. In the illustrated arrangement, the base of the bottle 40 is supported in a structure 44 that is formed as part of a cradle 46 for supporting the removable tank and providing a fixture for attaching the fuel lines of the engine. In the illustrative embodiment, the cap 44 is attached to the support 46 through a spring loaded sliding joint at 48. This allows the cap 44 to be displaced laterally for insertion of the tank or bottle 40 into the assembly. The spring loaded mechanism pulls the cap 44 back against the bottle to firmly seat the tank 40 and hold it in place. The sliding joint at 48 includes an internal spring which is not shown in the drawing but the construction of such joint will be apparent to those of ordinary skill in the art.

The support mechanism 46 also includes a hand lever 50 which is utilized to facilitate attaching the fuel lines of the diesel engine to the tank 40. As will be described, the mechanism for attaching the fuel lines is similar to that shown in the first embodiment of FIGS. 1–5 and includes fittings that are specifically designed to puncture a sealing mechanism attached to the tank 40 so as to allow the fuel to be dispensed to the engine. Also visible within the tank 40 are fuel lines 52 and 54. These lines are constructed within the tank and are preferably formed integral with the cap of the tank. The fuel line 52 shown in FIG. 6 is actually a vent line while the fuel line 54 is the fuel feed line. Not visible in FIG. 6 is a third line used with diesel engines as a fuel return line as was discussed with regard to FIG. 1.

Figure 7:
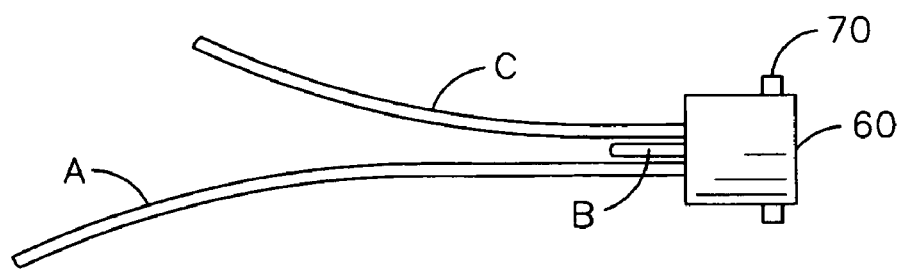
FIG. 7 is a simplified illustration of a fuel cap used with the tank of FIG. 6.

Referring now to FIG. 7, there is shown a cross-sectional view of one form of cap designed specifically for the present application in which the aforementioned fuel feed line A, fuel return line B and vent line C are integrally molded into the cap during manufacture thereof. The cap 60 includes a threaded portion 62 designed to thread on to the conventional threads of a typical soda or cola bottle used as a tank 40. However, the cap further includes a flange extending annularly around the base of the cap and adapted to snap over the conventional annular rib formed around the neck of the typical cola bottle. The flange 64 is designed such that once the cap is threaded on to the bottle, the flange surface 66 (see FIG. 15) will engage the rib and not allow the cap to be removed. During installation, the tapered portion 68 of the flange 64 allows the flange to ride up over the rib on the bottle. For this purpose, the lower portion of the cap may have a pair of opposed slits (not shown) to allow the lower portion of the cap to expand sufficiently to allow the flange to slip over the rib.

Figure 8:
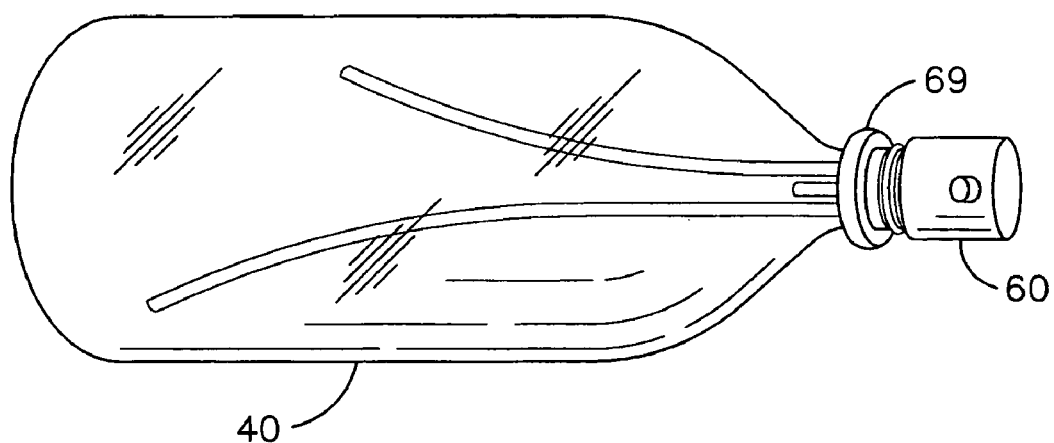
FIG. 8 illustrates the tank of FIG. 6 with the cap of FIG. 7 partially installed.

FIG. 8 illustrates the cap 60 partially attached to the threaded opening of a bottle or tank 40 and shows the rib 69 located below the threaded portion (see also FIG. 16). It will be noted that the cap 60 also includes a pair of opposed studs 70 which are used in the attachment of the tank 40 to the support mechanism 46.

Figure 9:
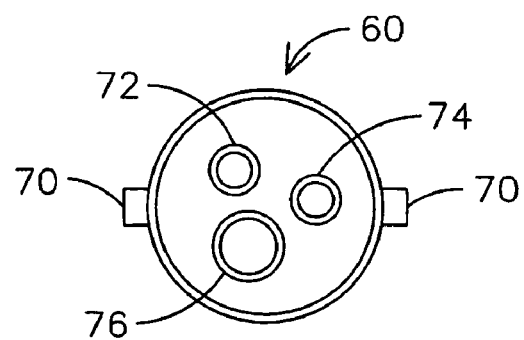
FIG. 9 is a top view of the cap of FIG. 7.

FIG. 9 is a top view of the cap 60 showing positioning of the three connections into the fuel tank described above. In a preferred embodiment, the cap 60 is molded as an integral unit with the fuel feed and return lines and vent lines formed in the cap. Each of the lines must terminate at a predetermined location to enable connection of the fuel lines with the engine into the correct one of the respective lines. It is contemplated that the internal molded lines will terminate just short of penetrating the surface of the cap 60 so that there is a plastic layer of cap that closes the ends of those lines from the outer surface of the cap. In FIG. 9, the vent line is shown at 72, the return line is shown at 74 and the fuel feed line is shown at 76. It will be appreciated that the connections of the fuel lines to the cap requires that the appropriate devices that are inserted through the cap be positioned in a similar configuration in the fuel connection mechanism to be described hereinafter. While the fuel lines and vent lines connected to the cap 60 are illustrated as being relatively long in order to adapt to the use in the longitudinally oriented tank of FIG. 6, it will be appreciated that the lines could be of different lengths if the tank is oriented in a vertical configuration with the cap being at the lowest point. In that event, there may not be a need for any integrated fuel lines for the fuel feed and fuel return line but may simply require a longer line for the vent. It is anticipated that the vent will be required since the tank is essentially sealed and air needs to be allowed to enter the tank in order to allow the fuel to dispense from the tank. However, it is also recognized that the vent line may be avoided if the tank is positioned in a vertical orientation by adding a one-way air valve at the bottom of the tank so that when the tank is positioned in its inverted orientation, air can enter through the air intake line at the uppermost end of the tank.

Figure 10:
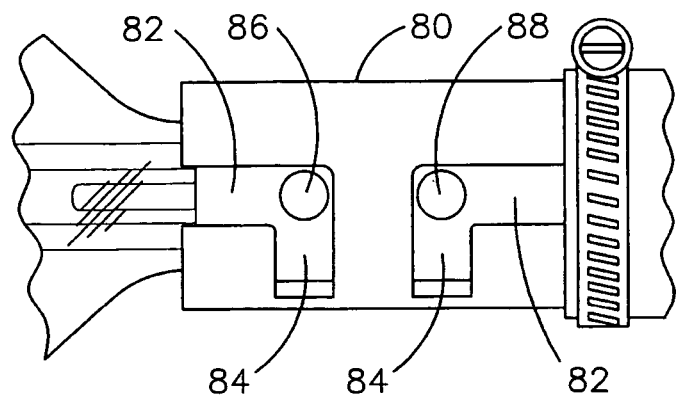
FIG. 10 illustrates one form of attachment of the tank of FIG. 8 to a fuel plug or fitting.
Figure 11:
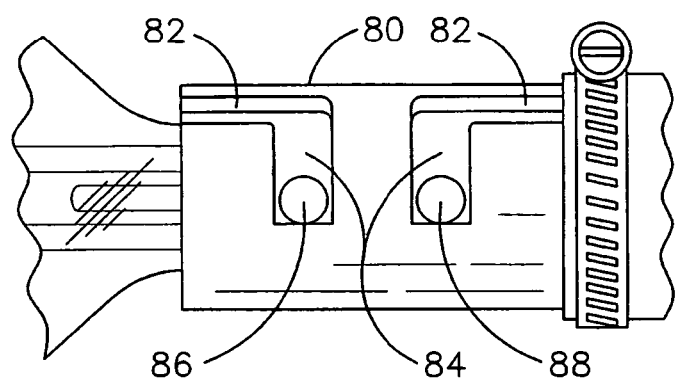
FIG. 11 illustrates the system of FIG. 10 in a locked position.

Turning now to FIGS. 10 and 11, there is shown a simplified illustration of one embodiment of the invention connecting the tank 40 to the fuel lines for the engine. Within the handle 50 described in FIG. 6, there is a sleeve 80 having a pair of grooves that are formed with a longitudinal slot 82 that connects to a pair of angularly arranged arcuate slots 84. Each of the cap 60 and the holder or plug 90 of the fuel inlet lines are designed with a pair of opposed lugs 86 that fit within the slot 82 and 84. When the fuel tank with the cap attached is pressed into proper alignment with the fuel line fittings, a pair of opposed lugs 88 slide within the slots 82. The sleeve 80 can then be rotated and the angular portion of the slots indicated at 84 will draw the cap and fuel line plug 90 together. FIG. 10 shows the same assembly but with the sleeve 80 rotated into the locked position.

Figure 12:
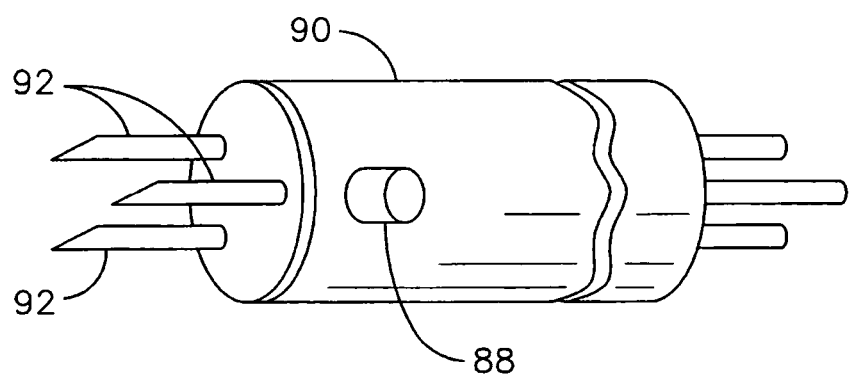
FIG. 12 shows one form of fuel plug used in FIG. 10.

Turning to FIG. 12, there is shown a simplified drawing of the plug device 90 which interfaces with the cap 60 to connect the fuel and vent lines to the tank 40. The plug 90 is securely fastened to the support apparatus 46 and is contained within the lever 50. The plug 90 has a plurality of fangs 92, each of which corresponds to one of the fuel or vent lines entering the rear of the plug. The short lug 88 which fits within the slot 82 in the sleeve 80 is shown on the side of the plug 90.

FIG. 13 is a simplified respective view of the sleeve 80 and illustrates the small protrusion or lug 94 which fits within a slot 96 in the lever 50. FIG. 14 is an inner view of the lever 50 which shows the opening 98 for receiving the sleeve 80 and also the slot 96 that receives the protrusion 94. The protrusion and slot couple the lever and sleeve 80 together so that rotation of the lever will affect the rotation of the sleeve.

FIG. 15 is a cross-sectional view of the cap 60 without the fuel and vent lines inserted. Considering FIG. 15 in conjunction with FIG. 16 which shows the threaded end of the tank 40, it can be seen that the cap 60 threadedly engages the tank 40 until the flange 64 flips over the conventional annular ridge 69 near the base of the threaded portion of the tank connector 102.

The invention claimed is:

1. A method for preventing use of an unapproved fuel in a diesel engine comprising:
   providing a fuel tank that does not have a conventional fueling opening and has a puncturable fitting for connection to fuel lines of the engine;
   connecting the engine fuel lines to apparatus having fangs adapted for puncturing the fuel tank fitting; and
   advancing the fitting and fangs into operative association to allow fuel to flow from the tank to the fuel line.

2. The method of claim 1 wherein the fuel tank can only be refilled when removed from the engine.

3. The method of claim 2 wherein the step of refilling the tank is controlled by instructing authorized refillers on replacement of the fittings.

* * * * *